United States Patent [19]

Sato

[11] Patent Number: 5,446,513
[45] Date of Patent: Aug. 29, 1995

[54] CAMERA

[75] Inventor: Yuichi Sato, Kanagawa, Japan

[73] Assignee: Olympus Optical Co., Ltd., Tokyo, Japan

[21] Appl. No.: 186,534

[22] Filed: Jan. 26, 1994

[30] Foreign Application Priority Data

Feb. 17, 1993 [JP] Japan .................................. 5-028277

[51] Int. Cl.⁶ .............................................. G03B 17/42
[52] U.S. Cl. ...................................... 354/204; 354/206; 354/275
[58] Field of Search ........................ 354/204, 206, 275

[56] References Cited

U.S. PATENT DOCUMENTS

| 4,199,243 | 4/1980 | Nakano | 354/204 |
| 4,949,109 | 8/1990 | Shimada et al. | 354/204 |
| 5,003,331 | 3/1991 | Shimada et al. | 354/204 |
| 5,070,349 | 12/1991 | Haraguchi et al. | 354/204 |

Primary Examiner—Monroe H. Hayes
Attorney, Agent, or Firm—Finnegan, Henderson, Farabow, Garrett & Dunner

[57] ABSTRACT

A camera using a film cartridge of the type that the spool shaft of the film cartridge is turned to initially feed the photographing film, in which, even if no film cartridge is loaded in it, the shutter can be charged and released, and it is unnecessary to charge and release the shutter during the initial film feeding operation. In the case where, in a camera, a film cartridge has been loaded with its rear cover closed, a clutch gear for driving a charge gear is spaced away from a winding gear, so that the shutter is held released. On the other hand, when no film cartridge has been loaded in the camera, the clutch gear for driving the charge gear is moved by a second engaging lever to engage with the winding gear, so that the shutter can be charged and released.

21 Claims, 8 Drawing Sheets

CAMERA

BACKGROUND OF THE INVENTION

This invention relates to cameras, and more particularly to a camera using a film cartridge of the type that the spool shaft of the film cartridge is turned to initially feed the photographing film.

Recently, a variety of cameras have been proposed which use a film cartridge with the leader of the photographing film not exposed outside, and the spool shaft of the film cartridge is turned to initially feed the film. With a camera of this type, it is unnecessary for the user (or operator) to pull the film from the cartridge; that is, the camera operates to pull the film out of the cartridge. Therefore, the film can be positively loaded in the camera.

On the other hand, in the case of a camera using a conventional film cartridge with the leader of the photographing film pulled out, the initial film winding operation is performed manually as follows: After the cartridge is loaded in the camera, a manual operation that the film is wound one frame and then the shutter is released is repeatedly carried out until the first frame of the film becomes ready for exposure.

Let us consider a camera which is permitted to use a film cartridge with the film leader not exposed outside, and is able to manually achieve the initial film feeding operation. If the camera employed the above-described conventional winding mechanism, then after the cartridge is loaded, it is necessary to perform the manual operation that the film is wound one frame and then the shutter is released.

Accordingly, an object of this invention is to eliminate the above-described difficulties accompanying a conventional camera. More specifically, an object of the invention is to provide a camera using a film cartridge of the type that the spool shaft of the film cartridge is turned to initially feed the photographing film, in which, even if no film cartridge is loaded in it, the shutter can be charged and released, and it is unnecessary to charge and release the shutter during the initial film feeding operation.

SUMMARY OF THE INVENTION

The foregoing and other objects of the invention have been achieved by the provision of a camera in which in an initial film feeding operation, the spool shaft of a film cartridge is turned in a film winding direction to feed a photographing film towards a film winding spool, which, according to the invention, including: winding means; winding gear means for transmitting the drive force of the winding means to the spool shaft of the film cartridge and the shaft of the winding spool; charge gear moving means which supports charge gear means which engages with the winding gear means to charge the shutter of the camera, and when the film cartridge is loaded in the camera, moves the charge gear means to a position where the charge gear means is spaced away from the winging gear means; movable gear means which, when the rear cover of the camera is closed, engages with the winding gear means; lever means provided on the movable gear means, the lever means turning through a predetermined angle corresponding to the initial film feeding operation, to move the charge gear moving means to a position where the charge gear moving means engages with the winding gear means.

When the film cartridge has been loaded in the camera with the rear cover of the camera closed, the charge gear moving means is spaced away from the winding gear means until the initial film feeding operation is accomplished, so that the shutter is held released; whereas when the film cartridge has not been loaded in the camera yet, the charge gear moving means is held at a predetermined position by the lever means so that the charge gear moving means is engaged with the winding gear means to charge the shutter.

According to another aspect of the invention, there is provided a camera body in which a film cartridge having a roll film rolled around a film spool may be loaded by feeding a leading edge of the roll film through rotation of the film spool, comprising: an operating member which may be manually rotatably operated; a first means for carrying out an initial feeding operation of the film, the first means including an engagement member for engaging with the film spool and a first transmission gear train for transmitting a driving torque, generated by the rotational operation of the operating member, to the engagement member; a second means for carrying out a film winding operation for the film subsequently after the initial feeding operation, the second means including a winding spool for winding the film and a second transmission gear train for transmitting a driving torque, generated by the rotational operation of the operating member, to the winding spool; a means for carrying out a shutter charge operation; and a third transmission gear train for transmitting the driving torque, generated by the rotational operation of the operating member, to the shutter charge operation means, wherein the third transmission gear train is kept under an engagement condition at least after the completion of the initial feeding operation.

The camera body may further include a means for disengaging a part of the third gear train, the disengaging means for co-operating with the initial feeding operation of the film, and a means for keeping the third transmission gear train under an engagement condition when the co-operating means has been moved through a distance corresponding to an amount of the film through the initial feeding operation.

According to still another aspect of the invention, there is provided a camera body in which a film cartridge having a roll film rolled around a film spool may be loaded by feeding a leading edge of the roll film through rotation of the film spool, comprising: an operating means which may be manually rotatably operated; a first means for carrying out a feeding operation of the film, the first means including an engagement member for engaging with the film spool and a first transmission means for transmitting a driving torque, generated by the rotational operation of the operating means, to the engagement member; a second means for carrying out a film winding operation for the film subsequently after the feeding operation, the second means including a winding spool for winding the film and a second transmission means for transmitting a driving torque, generated by the rotational operation of the operating means, to the winding spool; a means for carrying out a photographic preparatory operation; a third transmission means for transmitting the driving torque, generated by the rotational operation of the operating means, to the photographic preparatory means; and a means for interrupting the transmission of the driving torque to the photographic preparatory means at least until the completion of the feeding operation.

The camera body may further include a means for disabling the interrupting means when the film cartridge is not loaded in the camera body.

The photographic preparatory means may include a means for carrying out a shutter charge operation.

According to the invention, also, there is provided a camera body in which a film cartridge having a roll film rolled around a film spool may be loaded by feeding a leading edge of the roll film through rotation of the film spool, comprising: an operating means which may be manually rotatably operated; a film feeding means for manually feeding the film by utilizing a force generated by the operation of the operating means, the film feeding means including a feeding means for feeding the film to an outside of the film cartridge, and a winding means for winding the fed film; a photographic preparatory means for carrying out a photographic preparatory operation for a next photographic shot in corporation with the feeding operation of the film by the film feeding means; and means for keeping the photographic preparatory means under an inoperative condition at least during the operation of the feeding means.

According to still another aspect of the invention, there is provided a camera body for a cartridge having a roll film rolled around a film spool may be loaded by feeding a leading edge of the roll film through rotation of the film spool, comprising: an operating means which may be manually rotatably operated; a film feeding means for manually feeding the film by utilizing a force generated by the operation of the operating means, the film feeding means including a feeding means for feeding the film to an outside of the film cartridge, and a winding means for winding the film which is fed subsequently after the feeding operation; a retaining means for forcibly retaining the feeding means at the time when the film has been fed one frame by the feeding means; and a means for disabling the retaining means at least until the completion of the feeding operation.

According to still another aspect of the invention, there is provided a camera for a film feeding type film cartridge having a film spool, comprising: a winding spool for winding the film therearound; a winding means for transmitting a driving force for winding the film to at least two of the film spool of the film cartridge and the winding spool; a shutter for controlling an exposure amount of light to be exposed on the film; a charging means for charging the shutter by a drive force in engagement with the winding means; a separating means for separating the charging means away from the winding means in response to a loading operation of the film cartridge; and a pressure means for angularly moving through angle in correspondence with an initial feeding operation by the drive force of the winding means and for pressing the separating means so that the separated charging means and the winding means are driving engaged with each other.

The pressure means is in corporation with a film windup means which is engaged with the winding means when a rear cover of the camera is closed.

The winding means is provided with a manual winding operation means and is driven by the drive force from the manual winding operation means.

The camera may further include a planet gear mechanism and a sprocket between the winding means and the spool of the film cartridge, the sprocket being engaged with perforations of the film and being provided with an intermediate gear which is rotatable at a higher rotational speed than that of the spool of the film cartridge.

The camera may further include a film winding operating means located coaxially with the spool of the film cartridge, whereby the film may be wound by the film winding operating means by releasing driving engagement of the intermediate gear.

The camera may further include: a rotational means for rotating in response to an opening and closing operation of a rear cover of a camera; a sector gear rotatably supported to the rotational means for rotating through an angle in correspondence with an initial feed of the film with a gear portion engaged with the film winding operating means; and a lever means urged toward the sector gear relative to the rotational means and rotated through a predetermined angle for pressing the moving means.

The lever means operates to press the separating means for engaging the winding means the charging means when the initial feed has been completed after the separating means has released the engagement between the winding means and the charging means in corporation with the loading of the film cartridge.

The camera may further include: a loading/unloading detection means for detecting whether the film cartridge is loaded or unloaded; a means for moving, in response to the loading/unloading detection means, the charging means in a direction away from the winding means when the film cartridge is loaded, and in a direction in which the charging means is engaged with the winding means when the film cartridge is unloaded.

The loading/unloading detection means includes a link mechanism which is rotated in corporation with the loading operation of the film cartridge.

According to the invention, there is provided a camera for a film feeding type film cartridge having a film spool, comprising: a winding spool for winding the film therearound; a winding means for transmitting a film winding drive force to at least two of the film spool of the film cartridge and the winding spool; a charging means engaging with the winding means for charging a shutter by the drive force; a loading/unloading detection means for detecting whether or not the film cartridge is loaded; a moving means or separating the charging means away from the winding means for releasing a shutter charge when the film cartridge is detected to be loaded by the detection means, and for engaging the charging means with the winding means for enabling a shutter charge when the film cartridge is detected to be unloaded by the detection means; and a pressure means for angularly moving through an angle in correspondence with an initial feed after the film cartridge has been loaded, for pressing the separating means in a direction in which the separated charging means and the winding means are driving engaged with each other.

According to still another aspect of the invention, there is provided a camera for a film feeding type film cartridge, comprising: a feeding means for feeding the film; a sector means for rotating by a drive force from the feeding means in response to a closing operation of a rear cover of the camera;

a charging means for charging a shutter by the drive force from the feeding means; a moving means for separating the charging means from the feeding means in response to a loading operation of the film cartridge to thereby release a shutter charge, and for engaging the charging means with a winding means to thereby enable the shutter charge; and a pressing means provided in the sector means and angularly moving through an angle in correspondence with an initial feed of the film for pressing the separated charging means against the feeding means.

DESCRIPTION OF THE PREFERRED EMBODIMENTS

A camera, which constitutes one embodiment of this invention, will be described with reference to the accompanying drawings.

Figures 1, 2:
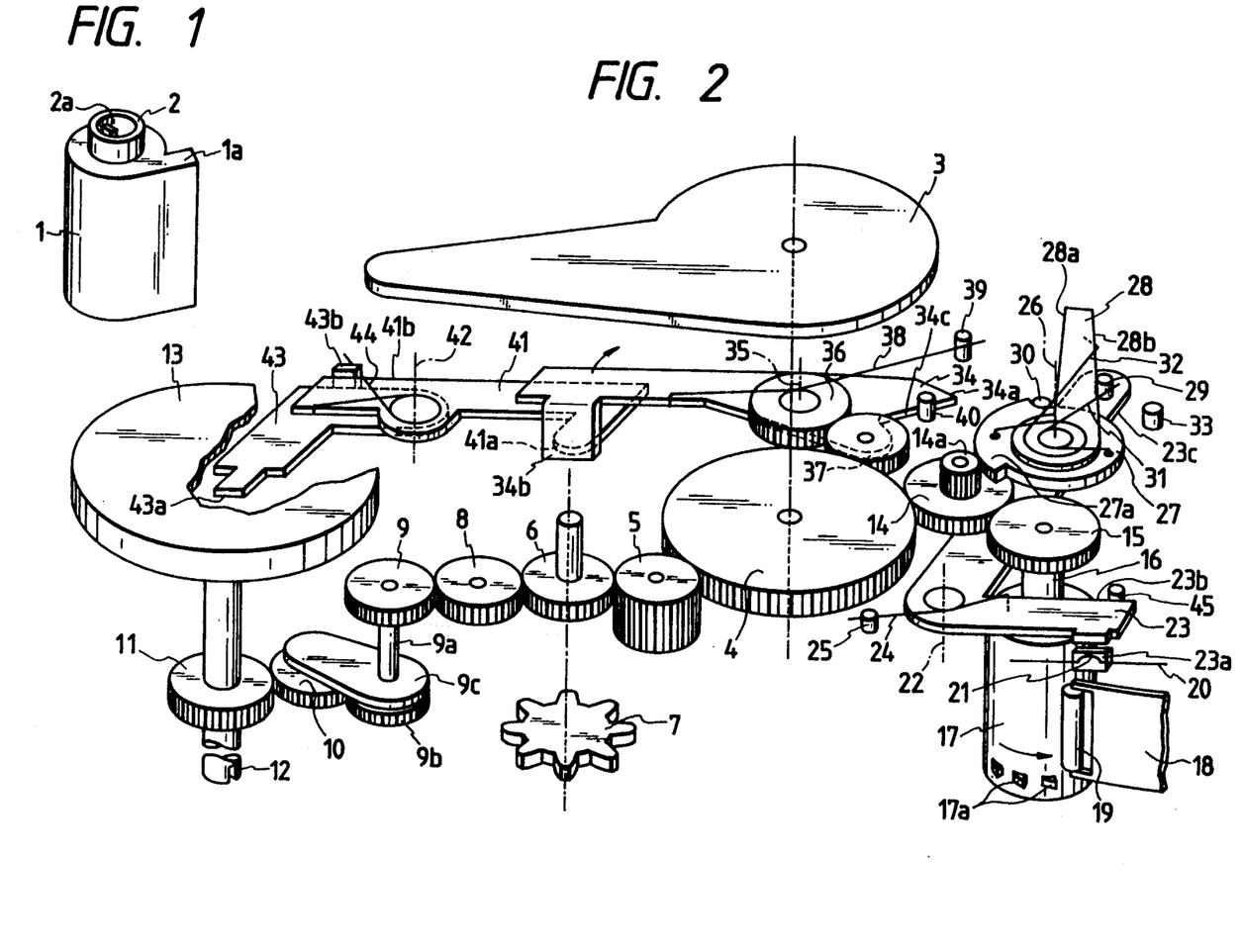
FIG. 1 is a perspective view showing an external appearance of a film cartridge applied to a camera according to this invention.
FIG. 2 is an exploded perspective view of a film driving mechanism in the camera of the invention, with no film cartridge loaded in it and with the rear cover closed.

FIG. 1 is a perspective view showing an external appearance of a film cartridge 1 applied to the camera of the invention. The film cartridge 1 includes a spool shaft 2, which is turned to initially feed the photographing film. The cartridge body has a film feeding outlet 1a. The film cartridge 1 further includes an engaging part 2a which is integral with the spool shaft 2 and is engageable with a fork shaped drive part 12 (cf. FIG. 2) provided in the camera. In the film cartridge 1, the photographing film is wound on the spool shaft 2. When the spool shaft 2 is turned counterclockwise, the film is fed out through the film feeding outlet 2a.

Figure 3:
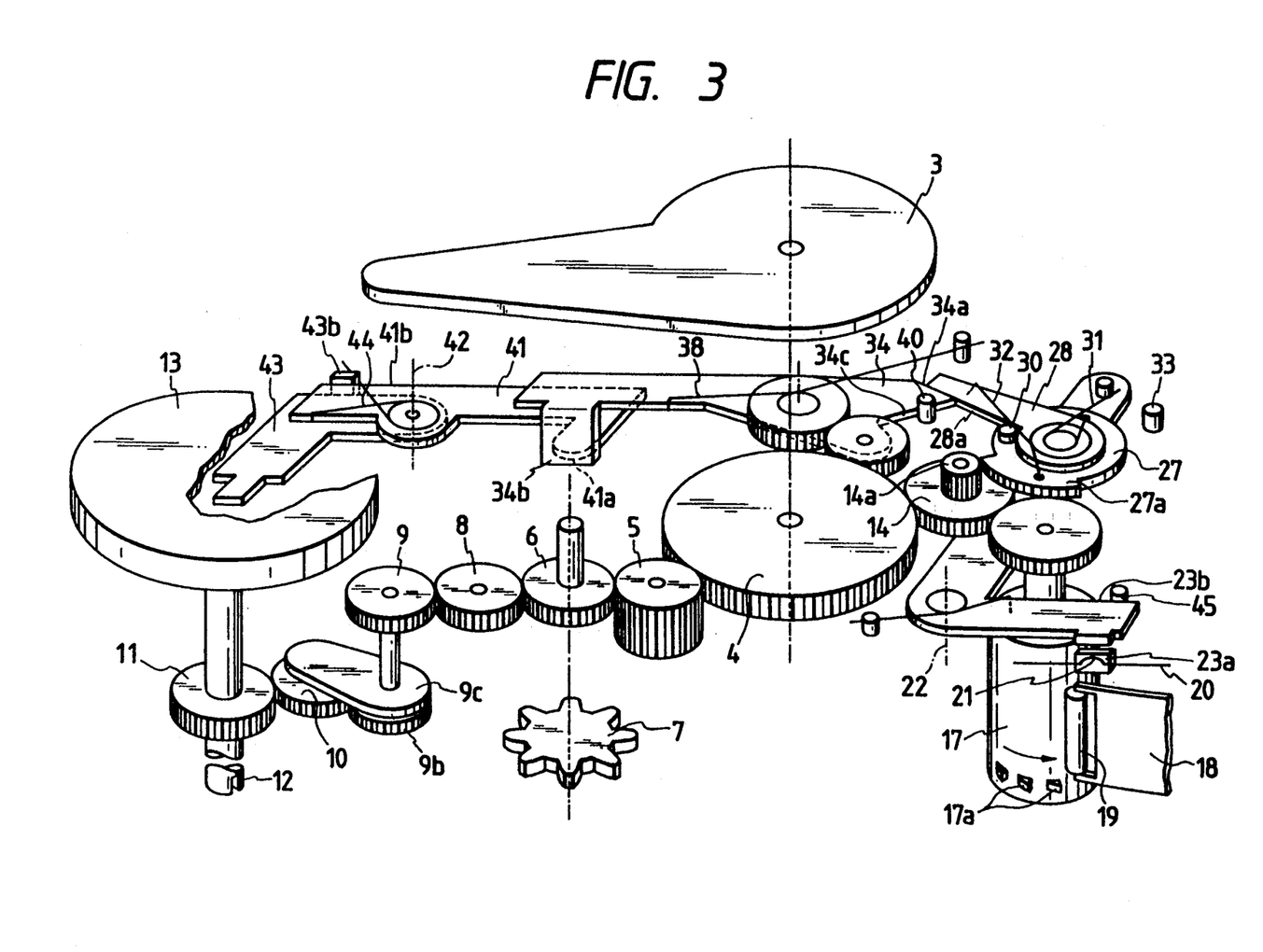
FIG. 3 is an exploded perspective view of the film driving mechanism shown in FIG. 2, with no film cartridge loaded in the camera and with the rear cover closed, in the case where a shutter releasing operation has been carried out several times.
Figure 4:
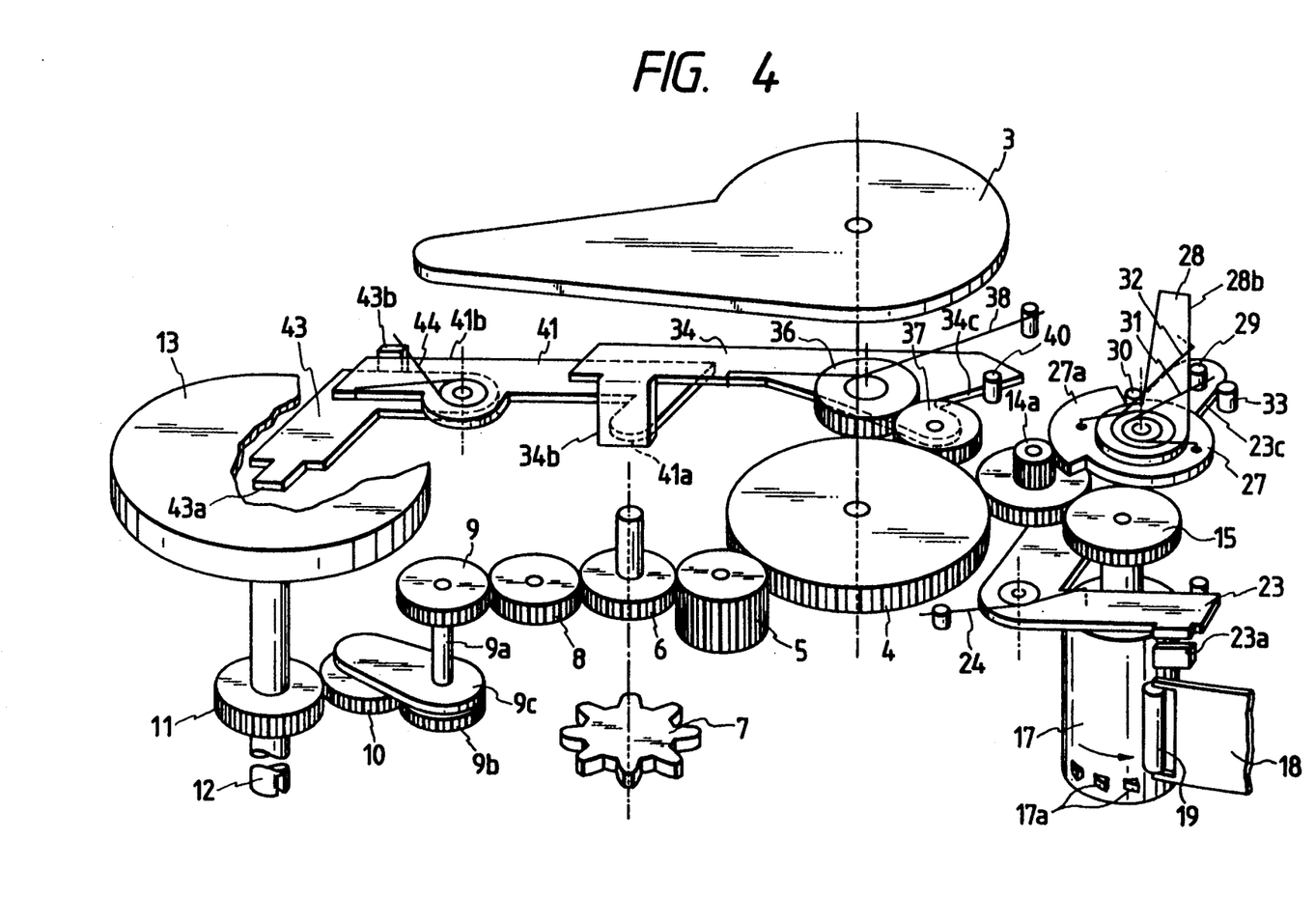
FIG. 4 is an exploded perspective view of the film driving mechanism shown in FIG. 2, with no film cartridge loaded in the camera and with the rear cover opened.
Figure 5:
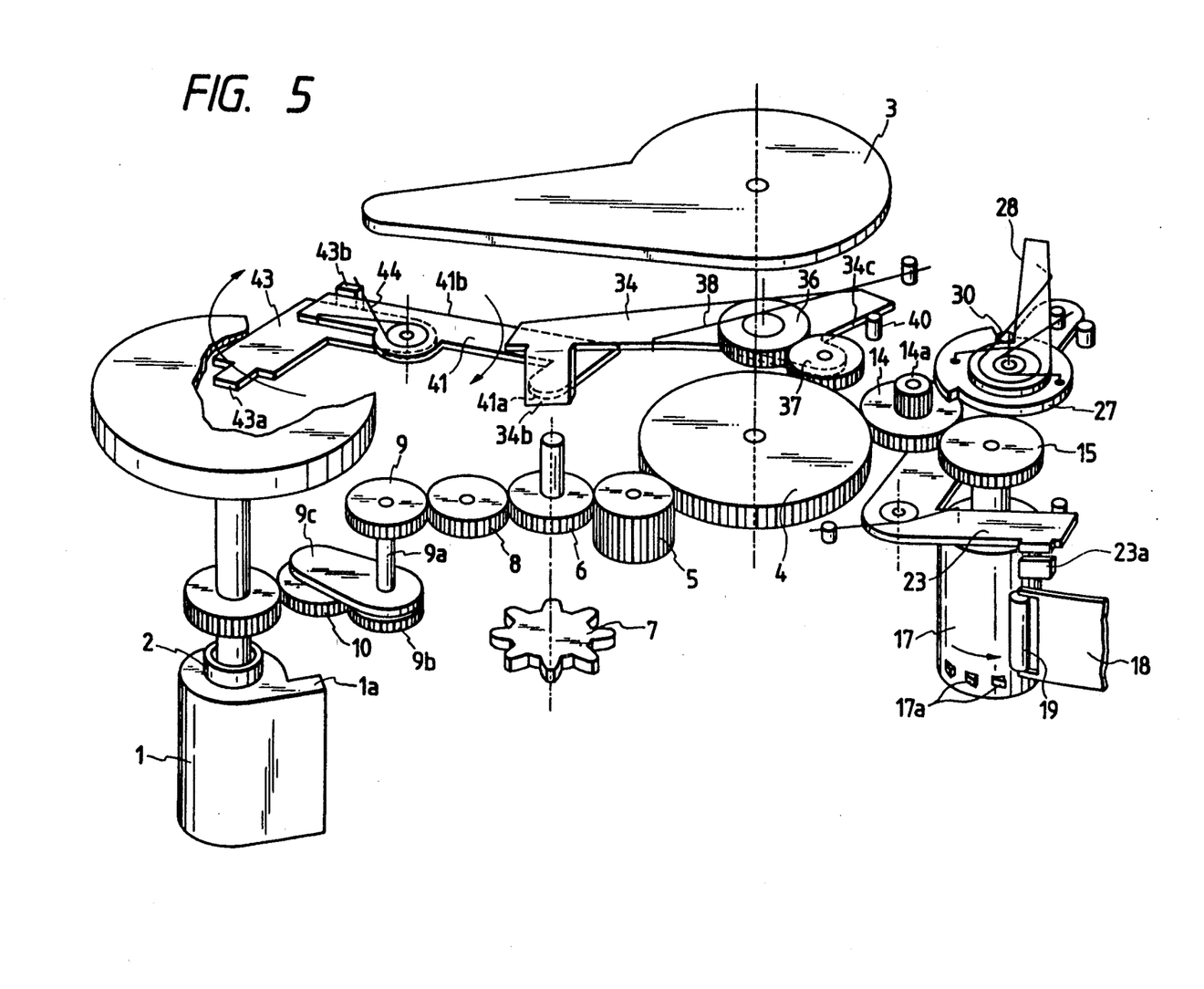
FIG. 5 is an exploded perspective view of the film driving mechanism shown in FIG. 2, with a film cartridge loaded in the camera and with the rear cover opened.
Figure 6:
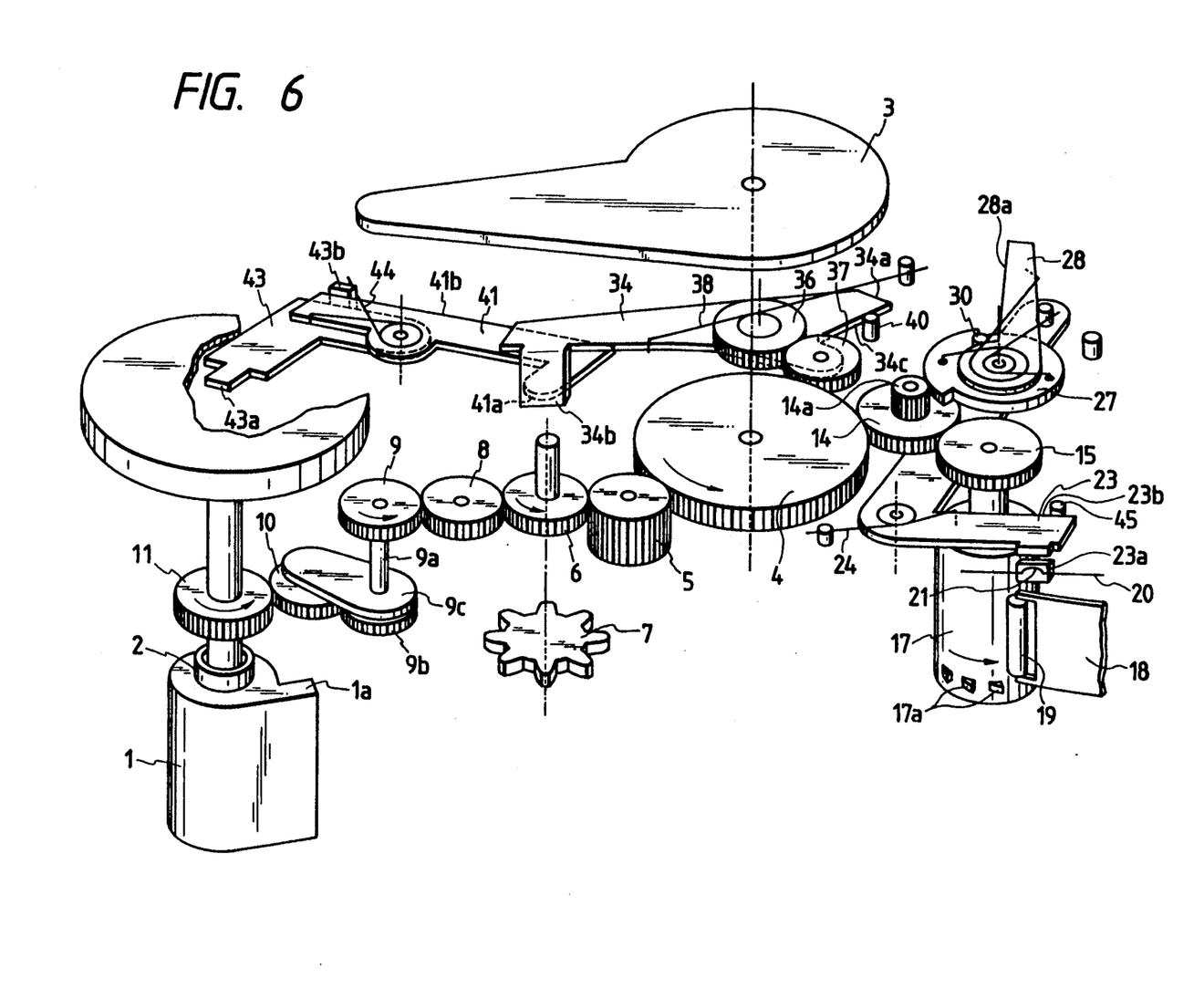
FIG. 6 is an exploded perspective view of the film driving mechanism shown in FIG. 2, with the film cartridge loaded in the camera and with the rear cover closed.
Figure 7:
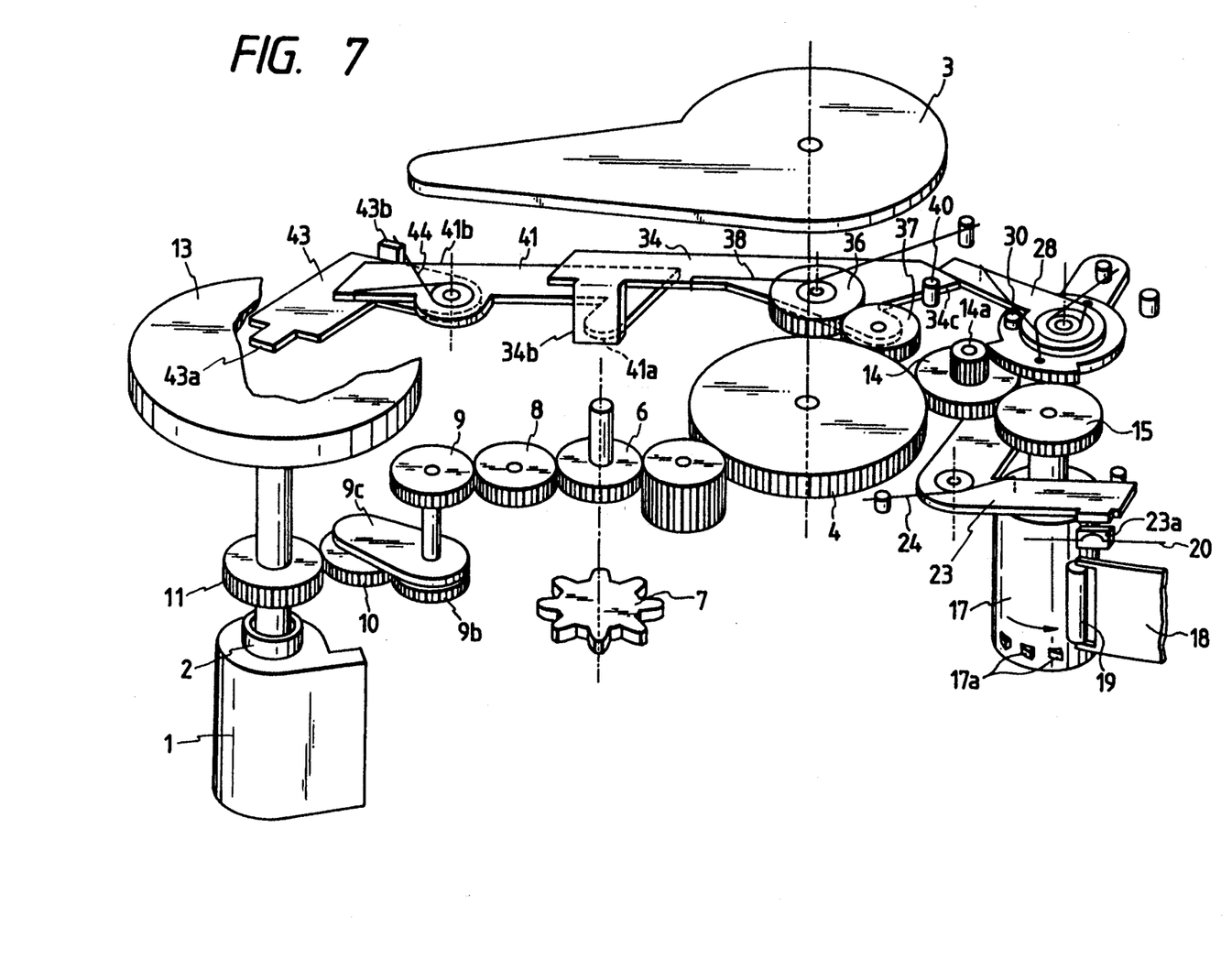
FIG. 7 is an exploded perspective view of the film driving mechanism shown in FIG. 2, with the film cartridge loaded in the camera and with the rear cover closed, in the case where the initial film feeding operation has been accomplished.

FIGS. 2 through 7 are perspective views of a film driving mechanism in the camera according to the invention. More specifically, FIGS. 2 through 4 are exploded perspective views for a description of the operation of the film driving mechanism with no film cartridge loaded in the camera, and FIGS. 5 through 7 are exploded perspective views for a description of the operation of the film driving mechanism with the film cartridge loaded in the camera.

Roughly stated, the film driving mechanism in the camera of the invention, as shown in FIGS. 2 through 7, comprises: winding means including a winding lever 3; winding gear means including a winding gear 4 driven together with the winding lever 3, and a double gear 14; charge gear means including a charge gear 36 which, whenever turned through a predetermined angle, charges the shutter, and a clutch gear 37 engaged with the charge gear 37; charge gear moving means including a release lever 34 which supports the aforementioned clutch gear 37, thus being able to disengage the latter 37 from the winding gear 4, and first and second detecting levers 41 and 43 for detecting whether or not the film cartridge is loaded, the levers 41 and 43 for operating the release lever 34; moving gear means including a sector gear 27 which is engageable with the small gear 14a of the double gear 14; and lever means including a second engaging lever 28 which is supported on the sector gear 27, and which, when turned through an angle corresponding to the initial feeding of the film, pushes the aforementioned release lever 34 to thereby move the clutch gear 37 to the position where it is engaged with the winding gear 4.

The film driving mechanism will be described in more detail.

It is assumed that the film is wound as follows: that is, whenever the winding lever 3 is turned counterclockwise through a predetermined angle, the film is wound one frame. The winding lever 3, turning together with the winding gear 4, drives a gear train consisting of an intermediate gear 5, a sprocket gear 6, an intermediate gear 8, and driven gear 9. The sprocket gear 6 is integral with a sprocket 7. The sprocket 7 is engaged with the perforations of the film, so that when the sprocket 7 is turned through a predetermined angle, the film fed by rotation of the spool shaft 2 is pulled out one frame.

The driven gear 9 is coupled through a shaft 9a to a sun gear 9b. A clutch arm 9c is mounted on the shaft 9a. On one end portion of the clutch arm 9c, a planet gear 10 engaged with the sun gear 9b is rotatably supported. More specifically, the planet gear 10 is set so that it is engageable with an engaging gear 11 which is integral with a rewinding knob 13. A fork-shaped driving part 12 is extended from the lower surface of the engaging gear 11 so that it is engaged with the engaging part 2a of the spool shaft 2.

The aforementioned double gear 14 is engaged with a spool gear 15, which is secured to a spool shaft 16 which supports a spool 17 on the camera side. The spool shaft 16 and the spool 17 are coupled to each other through a conventional slip mechanism (not shown) such as a spring. The spool 17 has a plurality of pawls 17a on its outer cylindrical surface, which are to engage with the perforations of the film which is fed by means of the sprocket 7. A leaf spring 18 supporting a roller 19 is provided on the end portion of a rear cover 20 (described later). The roller 19 serves to wind the film on the spool 17 with the rear cover 20 closed.

The rear cover 20 has a hinge (not shown) at its right end (in FIG. 2), so that the rear cover can be opened by turning it couterclockwise. The rear cover 20 has a protrusion 21 on the upper edge, to push the elastic part 23a of a first engaging lever 23 to be described later.

The first engaging lever 23 is supported by a shaft 22, and urged clockwise by a spring 24 whose one end is fastened to a spring hooking pin 25. On one side of one end portion of the first engaging lever 23, the aforementioned elastic part 23a is provided, and on the other side an engaging surface 23b is provided. When the rear cover 20 is closed, the protrusion 21 pushes the elastic part 23a, as a result of which the first engaging lever 23 is turned counterclockwise against the elastic force of the spring 24, and the engaging surface 23b abuts against a stop 45. Under this condition, the above-described sector gear 27 supported on the first engaging lever 23 is so positioned that it is held engaged with the small gear 14a of the double gear 14. In this case, the elastic part 23a absorbs the over-stroke of the protrusion 21 of the rear cover 20, so that the engaging surface 23b is positioned to abut against the stop 45.

The other end portion of the first engaging lever 23 is secured to a shaft 26. As was described above, the sector gear 27 and the second engaging gear 28 are mounted on the shaft 26. The sector gear 27 has teeth 27a in part of its outer periphery, and is engaged with the small gear 14a of the double gear 14 with the rear cover 20 closed as shown in FIGS. 2, 3, 6 and 7. When the rear cover 20 is opened, the protrusion 21 is released, so that the first engaging lever 23 is turned clockwise around the shaft 22 by the elastic force of the spring 24; that is, the sector gear 27 is disengaged from the double gear. In this case, the first engaging lever 23 is abutted against a stop 33.

A spring 31 has one end fastened to the sector gear 27, and the other end fastened to a stop 29 which is secured to the first engaging lever 23, thus urging the sector gear 27 clockwise. A spring 32 has one end fastened to the sector gear 27, and the other end fastened to the second engaging lever 28, so that the sector gear 27 and the second engaging lever 28 are pulled around the shaft 28 towards each other.

A stop 30 is fixedly secured to the sector gear 27. One engaging surface 28a of the second engaging lever 28 is abutted against the stop 30 by the elastic force of the spring 32. In addition, the other engaging surface 28b of the second engaging lever 28 is abutted against the stop 29 of the first engaging lever 23 by the elastic force of the spring 31 (cf. FIGS. 2 and 4).

The above-described release lever 34 and shutter charge gear 36 are mounted on a shaft 35. The clutch gear 37 engaged with the shutter charge gear 36 is rotatably mounted on the release lever 34. A film stopping reverse rotation preventing mechanism having a reverse rotation preventing claw 126 is provided between the shaft 35 and the shutter charge gear 36.

Figure 8:
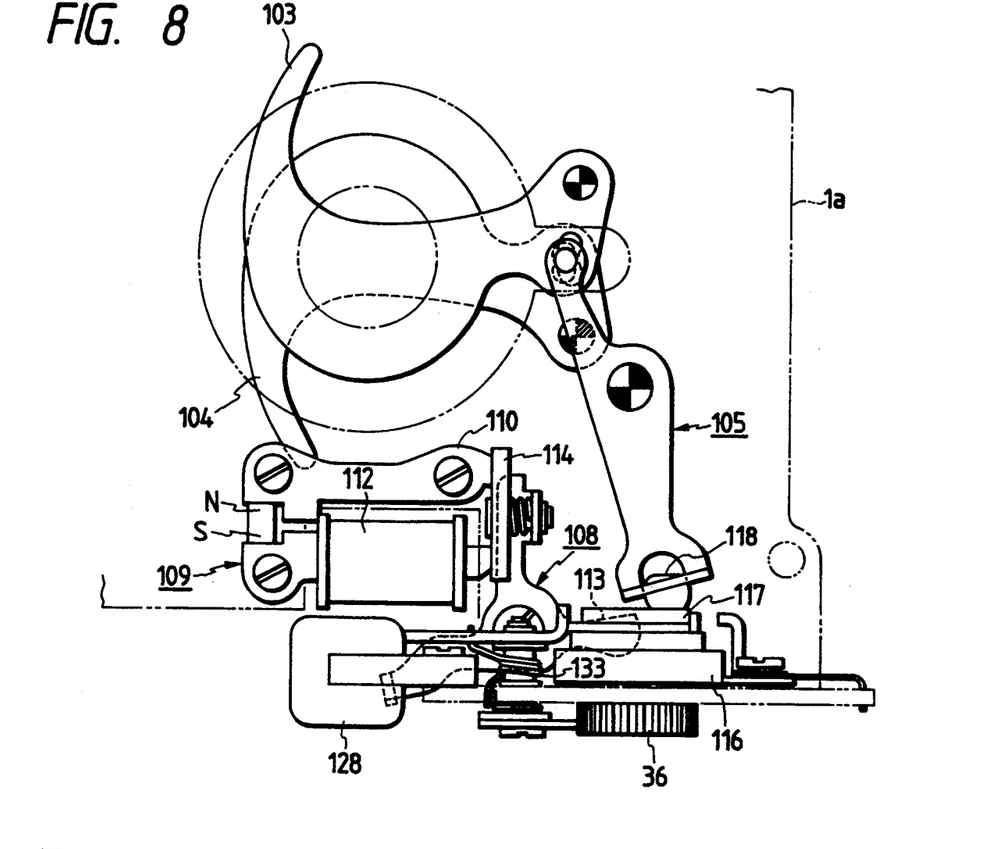
FIG. 8 is a side elevational view showing a shutter mechanism according to the invention.
Figure 9:
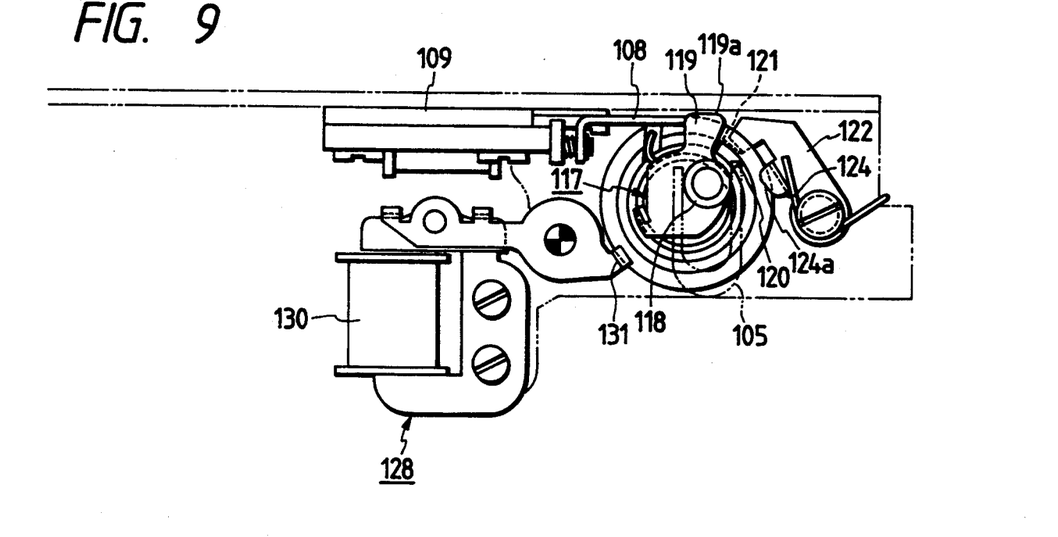
FIG. 9 is a plan view showing the shutter mechanism shown in FIG. 8.
Figure 10:
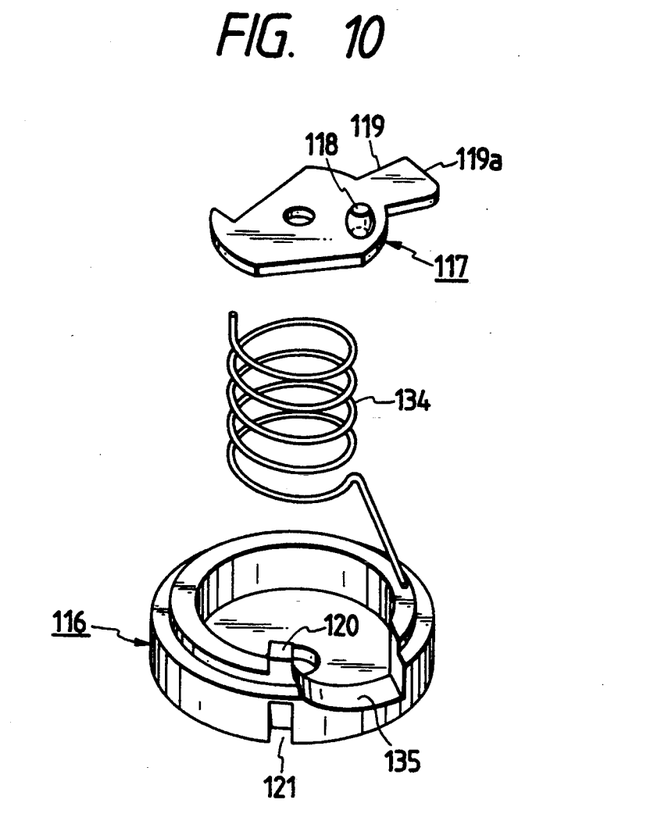
FIG. 10 is an exploded view showing a primary part of the shutter according to the invention.

The film stopping reverse rotation preventing mechanism will be explained with reference to FIGS. 8 to 10. FIGS. 8 and 10 show a state where the film winding operation has been completed. A rotational torque is accumulated in a coil spring 134 shown in FIG. 10 for urging a shutter drive member 117 in the counterclockwise direction (in FIG. 9). An engagement claw 113 of a start position limiting member 108 is engaged with a projection 119 of the shutter drive member at a position facing a lower end portion of a slanted curved surface 135 of a winding co-operation plate 116, thereby preventing the counterclockwise rotation of the shutter drive member 117. The winding co-operation plate has its engagement projection 120 positioned behind the projection 119 and is prevented from rotating by a film winding hook 122 inserted into a recess 121.

Under this condition, in photographing operation, it is sufficient to push a shutter button (not shown). Each of coils 112 and 130 of release type electromagnets 109 and 128 receives current. Accordingly, the start position limiting member 108 is released from the restriction of the release type electromagnet 9 and is rotated in a direction away from a core 110. At the same time, the engagement condition of the shutter drive member 117 is released. Then, although the shutter drive member 117 is rotated immediately counterclockwise by the spring force of the coil spring 134, because of the intervention of an engagement claw 131 of the shutter speed select member 127 attracted by the electromagnet 128, the drive member 117 is once stopped with the projection in abutment with the engagement claw 131 of the shutter speed select member 127. At this time, a drive pin 118 provided on the shutter drive member 117 causes a rotational member 105 to rotate in a returning direction. The rotational member 105 drives two shutter blades 103 and 104 to hole them in a fully open position. The current supply time of the oil 130 of the electromagnet 128 is controlled in accordance with an exposure amount. In a predetermined period of time, the holding force of the shutter speed select member 127 for the shutter drive member 117 is consumed. Then, the shutter drive member 117 is rotated again in the same direction while pushing the shutter speed select member 127 with its projection 119. When the projection 119 is brought into contact with the engagement projection 120 of the wind co-operation plate 116, the accumulated force of the coil spring 134 is almost consumed to stop the rotation. At this time, the drive pin 118 of the shutter drive member 117 causes the rotational member 105 to rotate in the return direction to thereby close the shutter blades 103 and 104. Incidentally, immediately before stopping, the shutter drive member 117 causes a cam surface 119a of the projection 119 to be in sliding contact with a cam surface 124a of a upright piece 124 provided on the film winding hook 122 to thereby disengage the film winding hook 122 away from the recess 121 of the co-operation plate 116. Also, it is possible to insure a shock absorbing effect for the shutter drive member 117 by the sliding contact. The current for the coil 112 of the release type electromagnet 9 has been already stopped. The start position limiting member 108 causes its engagement claw 113 to come into contact with a lower end portion of the slanted curved surface 135 of the winding co-operating plate 116 to hold an attraction piece 114 away from the coil 110.

Subsequently, when the film winding operation is carried, the shutter charge gear 36 and the winding co-operation plate 16 are rotated together counterclockwise, and the shutter drive member 117 is moved in accordance with these components with its projection 119 in contact with the engagement projection 120 of the winding co-operation plate 116. Also, in accordance with the co-operation plate 116, the start position limiting member is rotated while its engagement claw 113 is pressed by the slanted curved surface 135. As a result, the attraction piece 114 is attracted and held by the coil 110 of the release type electromagnet 109 to locate the engagement claw 113 on a rotary path of the projection 119 of the shutter drive member 117. Accordingly, the shutter drive member 117 is stopped with its projection 119 in contact with the engagement claw 113. Thereafter, the coil spring 134 is charged by the rotation of the shutter charge gear 36 and the winding co-operation plate 116. Then, when the winding co-operation plate 116 is rotated with the engagement projection 120 behind the projection 119 of the shutter drive member 117, the film winding hook 122 is inserted into the recess 121 of the winding co-operation plate 116 to thereby prevent the shutter charge gear 36 and the winding co-operation plate 116 from rotating, thereby completing the winding operation for one film frame. Thus, the next photographing operation is possible.

On the other hand, one end portion of the release lever 34 has engaging surfaces 34a and 34c, and the other end portion has an engaging surface 34b which is a bent surface. A spring 38 has its one end fastened to the release lever 34, and the other end fastened to a spring hooking pin 39, so that the release lever 34 is urged to turn clockwise, and the engaging surface 34c is abutted against a stop 40. Under this condition, the clutch gear 37 is held engaged with the winding gear 4.

The above-described first and second detecting levers 41 and 43 are mounted on a stationary shaft 42. A spring 44 has its one end fastened to the first detecting lever 41, and the other end fastened to an engaging surface 43b of the second detecting lever 43, so that an engaging surface 41b of the first detecting lever 41 is abutted against the engaging surface 43b of the second detecting lever 43. One end portion of the first detecting lever 41 has an engaging protrusion 41a which is extended from the side which is opposite to the side where the engaging surface 41b is provided. The second detecting lever 43 has a cartridge abutting part 43a at its end opposed to the end where the engaging surface 43b is provided. The cartridge abutting part 43a is adapted to abut against the film cartridge 2 loaded in the camera. Since the release lever 34 is urged clockwise by the elastic force of the spring 38, the first and second detecting levers 41 and 43 are kept urged counterclockwise through the protrusion 41a of the first detecting lever 41.

The cartridge abutting part 43a of the second detecting lever 43 is protruded into the cartridge chamber of the camera body (not shown). When the film cartridge 1 is loaded in the cartridge chamber, the second detecting lever 43 is pushed through its abutting part 43, and the first detecting lever 41 is turned clockwise by the elastic force of spring 44. In addition, the release lever 34 is turned counterclockwise against the elastic force of the spring 38.

The operation of the film driving mechanism thus organized will be described.

It is assumed that no film cartridge is loaded in the camera, and the rear cover 20 is closed.

As shown in FIG. 2, since no film cartridge is loaded in the camera, the first and second detecting levers 41 and 43 have been turned counterclockwise, and the clutch gear 37 supported on the release lever 34 has been engaged with the winding gear 4. On the other hand, the first engaging lever 23 has been turned clockwise being pushed by the protrusion 31 of the rear cover 20, and the sector gear 27 has been engaged with the small gear 14a of the double gear 14.

In order to test the shutter release with no film cartridge loaded, the winding lever 3 is turned, so that the winding gear 4 is turned counterclockwise. The rotation of the winding gear 4 is transmitted through the gear train consisting the intermediate gear 5, the sprocket 6, and so forth, to turn the engaging gear 11 and the fork-shaped driving part 12 clockwise. At the same time, the spool gear 15 is turned counterclockwise through the double gear 14. In this case, since no film cartridge is loaded in the camera yet, the fork-shaped driving part 12 and the spool gear 15 are turned idly.

As the double gear 14 is turned, the sector gear 27 is turned through the small gear 14a. As the sector gear 27 is turned in this way, the second engaging lever 28 is turned while being abutted against the stop 30 of the sector gear 27.

On the other hand, when the shutter charge gear 36 is turned through a predetermined angle through the clutch gear 37, the film winding reverse rotation preventing mechanism acts to end the shutter charging operation. Thus, the shutter can be released.

The above-described operations are carried out several times until the film counter (not shown) of the camera indicates "Frame No. 1". Immediately before the film counter indicates "Frame No. 1" in this manner, the state of the film driving mechanism is as shown in FIG. 3. That is, the engaging surface 28a of the second engaging lever 28 is abutted against the engaging surface 34a of the release lever 34, and there is a small gap between the engaging surface 28a and the stop 30 of the stop gear 27.

Thereafter, the film winding operation is carried out once to cause the film counter to indicate "Frame No. 1". In this operation, the small gear 14a of the double gear 14 is turned; whereas the sector gear 27 acts as follows: That is, in the sector gear 27, the rear end ones of the teeth 27a are engaged with the small gear 14a, and therefore the sector gear is slightly turned, but by the elastic force of the spring 31, it is returned slightly corresponding to an angular movement through which it has been turned. In the following film winding operations, the sector gear is operated in the same way, so that the shutter release operation can be carried out with no film cartridge loaded in the camera. In this operation, the stop 30 and the engaging surface 28a are held slightly spaced from each other, and the engaging surfaces 28a and 34a are held abutted against each other.

FIG. 3 shows the film driving mechanism in the case where no film cartridge is loaded in the camera, and the rear cover 20 is closed. When, under this condition, the rear cover 20 is opened, the film driving mechanism operates as shown in FIG. 4.

In this case, the protrusion 21 of the rear cover 21 is released from pushing the elastic part 23a, and the first engaging lever 23 is turned clockwise by the elastic force of the spring 24 until its engaging surface 23c abuts against the stop 33. As the first engaging lever 23 is turned in this manner, the teeth 27a of the sector gear 27 are disengaged from the small gear 14a of the double gear 14, and the sector gear 27 and the second engaging lever 28 are turned clockwise until the engaging surface 28b abuts against the stop 29.

The operation of the film driving mechanism with the film cartridge 1 loaded in the camera will be described with reference to FIGS. 5 through 7.

When the film cartridge 1 is loaded in the cartridge chamber, then, in the camera, the fork-shaped driving part 12 is engaged with the engaging part 2a of the cartridge 1, and the outside of the cartridge 1 pushes the cartridge abutting part 43a of the second detecting lever 43, so that the latter 43 is turned clockwise as shown in FIG. 5. At the same time, the first detecting lever 41 is also turned clockwise with the aid of the spring 44, so that the engaging protrusion 41a pushes the engage surface 34b of the release lever 34, to turn the latter 34 counterclockwise. As the release lever 34 is turned in this manner, the clutch gear 37 supported on the release lever 34 is moved away from the winding gear 4; that is, the former 34 is disengaged from the latter 4. At the same time, the engaging surface 34c of the release lever 34 is moved away from the stop 40.

In order to make the camera ready for photographing, the initial film winding operation is carried out until the film counter (not shown) indicates "Frame No. 1". That is, first the rear cover 20 is closed. As a result, as shown in FIG. 6, the protrusion 21 of the rear cover 20 pushes the elastic part 23a of the first engaging lever 23, thereby to turn the latter 23 counterclockwise against the elastic force of the spring 24. As the first engaging lever 23 turns in this way, the engaging surface 23b is abutted against the stop 45, while the sector gear 27 is engaged with the small gear 14a of the double gear 14.

The film is further wound by operating the winding lever 3. In this operation, since the clutch gear 37 has been disengaged from the winding gear as was described above, the shutter is not charged, and the film stopping operation is not effected.

On the other hand, the rotation of the winding gear 4 is transmitted through the intermediate gear 5 to the sprocket gear 6 and the sprocket 7 to turn them counterclockwise, and further transmitted through the gear 8 to the driven gear 9 and the sun gear 9b to turn them. Finally, the clutch arm 9c is turned counterclockwise, so that the planet gear 10 is engaged with the engaging gear 11. As the sun gear 9b turns, the engaging gear 11 is turned, so that the fork-shaped driving part 12, and the engaging part 2a of the spool shaft 2 of the film cartridge 1 are turned counterclockwise. As the spool shaft 2 is turned in this manner, the film (not shown) is pulled out through the film feeding outlet 1a.

As was described above, the small gear 14a is engaged with the sector gear 27. Therefore, the second engaging lever 28 is turned counterclockwise through a predetermined angle by one winding operation. In the next winding operation, too, the second engaging lever 28 is turned through the predetermined angle. Hence, the engaging surface 28a gradually approaches the engaging surface 34a of the release lever 34.

The film thus fed out is engaged with the sprocket 7 through its perforations. When the film is pulled out by the sprocket, then it is moved at higher speed, because, in this operation, the film feeding speed is set higher than that provided by the rotation of the planet gear 10 and the engaging gear 11. The engaging gear 11 is driven according to the speed at which the film is pulled, so that torque acts on the engaging gear 11 to turn the latter 11 at higher speed. Hence, the speed of rotation of the planet gear 10 differs from the peripheral speed of the engaging gear 11. More specifically, the planet gear 10 is lower in peripheral speed than the engaging gear 11, and therefore the former 10 is kicked by the latter 11. As a result, the clutch lever 9c is turned clockwise, and the planet gear 10 is disengaged from the engaging gear 11.

When the film is further wound, the end of the film reaches the spool 17 and nipped by the roller 19, and the perforations of the film are engaged with the pawls 17a of the spool 17. Thus, the film begins to wind itself on the spool 17. The length of the film which is wound on the spool 17 by one winding operation is determined longer than the length which is pulled by the sprocket 7. The difference is absorbed by the slipping action of a slip mechanism (not shown) provided for the spool 17, and in this operation a braking force is applied to the spool 17.

On the other hand, as was described before, the sector gear 27 is also turned, so that the engaging surface 28a gradually approaches the engaging surface 34a of the release lever 34, and finally the former abuts the latter. As a result, the release lever 34 is turned clockwise until the engaging surface 34c abuts against the stop 40. Under this condition, the clutch gear 37 is engaged with the winding gear 4. As the release lever 34 is turned in this way, the engaging surface 34b pushes the engaging surface 41a, thus turning the first detecting lever 41 counterclockwise. On the other hand, the second detecting lever 43 is not turned, because the cartridge abutting part 43a is in abutment with the cartridge 1. Hence, a gap is formed between the engaging surfaces 41b and 43b, so that the spring 44 is elastically deformed.

The initial film winding operation is carried out in the above-described manner until immediately before the film counter indicates "Frame No. 1". This state is as shown in FIG. 7. When, under this condition, the film winding operation is carried out again, the film is wound one frame, and the film counter shows "Frame No. 1". And the shutter is charged, and the film is held stopped. Thus, the camera has become ready for photographing.

After exposure of the frames of the film, the latter is rewound by conventional means. For instance, the clutch mechanism of the sprocket 7 and the sprocket gear 6 is used to move the sprocket gear 6 along the shaft to disengage it from the gear 8. Under this condition, the rewinding knob (FIG. 7) is turned clockwise, so that the spool shaft 2 of the cartridge is turned with the fork-shaped driving part 12, to rewind the film into the film cartridge 1.

If summarized, in the case where the film cartridge has been loaded in the camera, the initial film winding operation is carried out so as to make the camera ready for photographing; that is, the winding lever 3 is operated without shutter release until the film is stopped. When the film is stopped, the initial film winding operation is ended, and the shutter is charged, and the film counter indicates "Frame No. 1".

In the case where no film cartridge has been loaded in the camera yet, for instance the shutter release can be readily tested, because the shutter is charged by operating the winding lever 3 only once.

As was described above, the invention relates to the camera of the type that the initial film feeding operation is carried out with the film cartridge loaded in it. The camera is improved as follows: In the case where no film cartridge is loaded in the camera, the shutter can be charged and released. On the other hand, in the case where the film cartridge is loaded in it, it is unnecessary to charge and release the shutter during the initial film feeding operation. Thus, the camera according to the invention is considerably convenient in practical use.

What is claimed is:

1. A camera body in which a film cartridge having a roll film rolled around a film spool may be loaded by feeding a leading edge of the roll film through rotation of the film spool, comprising:
   an operating member which may be manually rotatably operated;
   a first means for carrying out an initial feeding operation of said film, said first means including an engagement member for engaging with said film spool and a first transmission gear train for transmitting a driving torque, generated by the rotational operation of said operating member, to said engagement member;

a second means for carrying out a film winding operation for said film subsequently after the initial feeding operation, said second means including a winding spool for winding said film and a second transmission gear train for transmitting a driving torque, generated by the rotational operation of said operating member, to said winding spool;

a means for carrying out a shutter charge operation; and a third transmission gear train for transmitting the driving torque, generated by the rotational operation of said operating member, to said shutter charge operation means, wherein said third transmission gear train is kept under an engagement condition at least after the completion of said initial feeding operation.

2. The camera body according to claim 1, further comprising a means for disengaging a part of said third gear train, said disengaging means for co-operating with said initial feeding operation of the film, and a means for keeping said third transmission gear train under an engagement condition when said co-operating means has been moved through a distance corresponding to an amount of the film through said initial feeding operation.

3. A camera body in which a film cartridge having a roll film rolled around a film spool may be loaded by feeding a leading edge of the roll film through rotation of the film spool, comprising:

an operating means which may be manually rotatably operated;

a first means for carrying out a feeding operation of said film, said first means including an engagement member for engaging with said film spool and a first transmission means for transmitting a driving torque, generated by the rotational operation of said operating means, to said engagement member;

a second means for carrying out a film winding operation for said film subsequently after the feeding operation, said second means including a winding spool for winding said film and a second transmission means for transmitting a driving torque, generated by the rotational operation of said operating means, to said winding spool;

a means for carrying out a photographic preparatory operation;

a third transmission means for transmitting the driving torque, generated by the rotational operation of said operating means, to said photographic preparatory means; and a means for interrupting the transmission of the driving torque to said photographic preparatory means at least until the completion of said feeding operation.

4. The camera body according to claim 3, further comprising a means for disabling said interrupting means when the film cartridge is not loaded in the camera body.

5. The camera body according to claim 3, wherein said photographic preparatory means includes a means for carrying out a shutter charge operation.

6. A camera body in which a film cartridge having a roll film rolled around a film spool may be loaded by feeding a leading edge of the roll film through rotation of the film spool, comprising:

an operating means which may be manually rotatably operated;

a film feeding means for manually feeding said film by utilizing a force generated by the operation of said operating means, said film feeding means including a feeding means for feeding said film to an outside of said film cartridge, and a winding means for winding the fed film;

a photographic preparatory means for carrying out a photographic preparatory operation for a next photographic shot in corporation with the feeding operation of the film by said film feeding means; and means for keeping said photographic preparatory means under an inoperative condition at least during the operation of said feeding means.

7. The camera body according to claim 6, wherein said photographic preparatory means includes a means for carrying out a shutter charge operation.

8. A camera body in which a film cartridge having a roll film rolled around a film spool may be loaded by feeding a leading edge of the roll film through rotation of the film spool, comprising:

an operating means which may be manually rotatably operated;

a film feeding means for manually feeding said film by utilizing a force generated by the operation of said operating means, said film feeding means including a feeding means for feeding said film to an outside of said film cartridge, and a winding means for winding the film which is fed subsequently after the feeding operation;

a retaining means for forcibly retaining said feeding means at the time when said film has been fed one frame by said feeding means; and a means for disabling said retaining means at least until the completion of the feeding operation.

9. A camera for a film feeding type film cartridge having a film spool, comprising:

a winding spool for winding the film therearound;

a winding means for transmitting a driving force for winding the film to at least two of said film spool of said film cartridge and said winding spool;

a shutter for controlling an exposure amount of light to be exposed on the film;

a charging means for charging said shutter by a drive force in engagement with said winding means;

a separating means for separating said charging means away from said winding means in response to a loading operation of the film cartridge; and a pressure means for angularly moving through an angle in correspondence with an initial feeding operation by the drive force of said winding means and for pressing said separating means so that said separated charging means and said winding means are driving engaged with each other.

10. The camera according to claim 9, wherein said pressure means is in corporation with a windup means which is engaged with said winding means when a rear cover of the camera is closed.

11. The camera according to claim 9, wherein said winding means is provided with a manual winding operation means and is driven by the drive force from said manual winding operation means.

12. The camera according to claim 9, further comprising a planet gear mechanism and a sprocket between said winding means and said spool of said film cartridge, said sprocket being engaged with perforations of said film and being provided with an intermediate gear which is rotatable at a higher rotational speed than that of said spool of said film cartridge.

13. The camera according to claim 12, further comprising a film winding operating means located coaxially with said spool of said film cartridge, whereby the film may be wound by said film winding operating means by releasing driving engagement of the intermediate gear.

14. The camera according to claim 13, further comprising:
   a rotational means for rotating in response to an opening and closing operation of a rear cover of a camera;
   a sector gear rotatably supported to said rotational means for rotating through an angle in correspondence with an initial feed of the film with a gear portion engaged with said film winding operating means; and
   a lever means urged toward said sector gear relative to said rotational means and rotated through a predetermined angle for pressing said moving means.

15. The camera according to claim 14, wherein said sector gear is in the form of a sector.

16. The camera according to claim 14, wherein said lever means operates to press said separating means for engaging said winding means said charging means when the initial feed has been completed after said separating means has released the engagement between the winding means and said charging means in corporation with the loading of the film cartridge.

17. The camera according to claim 9, further comprising:
   a loading/unloading detection means for detecting whether said film cartridge is loaded or unloaded;
   a means for moving, in response to said loading/unloading detection means, said charging means in a direction away from said winding means when said film cartridge is loaded, and in a direction in which said charging means is engaged with said winding means when said film cartridge is unloaded.

18. The camera according to claim 17, wherein said loading/unloading detection means includes a link mechanism which is rotated in corporation with the loading operation of said film cartridge.

19. A camera for a film feeding type film cartridge having a film spool, comprising:
   a winding spool for winding said film therearound;
   a winding means for transmitting a film winding drive force to at least two of said film spool of said film cartridge and said winding spool;
   a charging means engaging with said winding means for charging a shutter by said drive force;
   a loading/unloading detection means for detecting whether or not the film cartridge is loaded;
   a moving means for separating said charging means away from said winding means for releasing a shutter charge when said film cartridge is detected to be loaded by said detection means, and for engaging said charging means with said winding means for enabling a shutter charge when said film cartridge is detected to be unloaded by said detection means; and
   a pressure means for angularly moving through an angle in correspondence with an initial feed after the film cartridge has been loaded, for pressing said separating means in a direction in which said separated charging means and said winding means are driving engaged with each other.

20. A camera for a film feeding type film cartridge, comprising:
   a feeding means for feeding the film;
   a sector means for rotating by a drive force from said feeding means in response to a closing operation of a rear cover of the camera;
   a charging means for charging a shutter by the drive force from said feeding means;
   a moving means for separating said charging means from said feeding means in response to a loading operation of the film cartridge to thereby release a shutter charge, and for engaging said charging means with a winding means to thereby enable the shutter charge; and
   a pressing means provided in said sector means and angularly moving through an angle in correspondence with an initial feed of said film for pressing the separated charging means against the feeding means.

21. A camera in which, in an initial film feeding operation, the spool shaft of a film cartridge is turned in a film winding direction to feed a photographing film towards a film winding spool, CHARACTERIZED in that said camera comprises:
   winding means;
   winding gear means for transmitting the drive force of said winding means to said spool shaft of said film cartridge and the shaft of said winding spool;
   charge gear moving means which
      supports charge gear means which engages with said winding gear means to charge the shutter of said camera, and
      when said film cartridge is loaded in said camera, moves said charge gear means to a position where said charge gear means is spaced away from said wing gear means;
   movable gear means which, when the rear cover of said camera is closed, engages with said winding gear means;
   lever means provided on said movable gear means,
      said lever means turning through a predetermined angle corresponding to said initial film feeding operation, to move said charge gear moving means to a position where said charge gear moving means engages with said winding gear means, and that
   when said film cartridge has been loaded in said camera with the rear cover of said camera closed, said charge gear moving means is spaced away from said winding gear means until said initial film feeding operation is accomplished, so that said shutter is held released, and
   when said film cartridge has not been loaded in said camera yet, said charge gear moving means is held at a predetermined position by said lever means so that said charge gear moving means is engaged with said winding gear means to charge said shutter.

* * * * *

UNITED STATES PATENT AND TRADEMARK OFFICE
CERTIFICATE OF CORRECTION

PATENT NO. : 5,446,513
DATED : August 29, 1995
INVENTOR(S) : Yuichi SATO

It is certified that error appears in the above-indentified patent and that said Letters Patent is hereby corrected as shown below:

Claim 6, column 14, line 13, change "corporation" to --cooperation--.

Claim 10, column 14, line 60, change "corporation" to --cooperation--.

Claim 16, column 15, line 34, change "corporation" to --cooperation--.

Claim 18, column 15, line 49, change "corporation" to --cooperation--.

Claim 21, column 16, line 44, change "wing" to --winding--.

Signed and Sealed this

Twenty-third Day of July, 1996

*Attest:*

BRUCE LEHMAN

*Attesting Officer*     Commissioner of Patents and Trademarks